United States Patent [19]
Antic et al.

[11] Patent Number: 5,561,854
[45] Date of Patent: Oct. 1, 1996

[54] RESTORATION OF A HOME LOCATION REGISTER IN A MOBILE TELEPHONE SYSTEM

[75] Inventors: Nenad Antic, Sollentuna; Karl-Erik Olsson, Upplands Väsby, both of Sweden; Andrew Went, Longparish, United Kingdom

[73] Assignee: Telefonaktiebolaget LM Ericsson, Stockholm, Sweden

[21] Appl. No.: 537,983

[22] Filed: Oct. 2, 1995

Related U.S. Application Data

[63] Continuation of Ser. No. 219,883, Mar. 30, 1994, abandoned.

[30] Foreign Application Priority Data

Mar. 31, 1993 [SE] Sweden .................................. 9301075

[51] Int. Cl.$^6$ ................................................. H04B 7/00
[52] U.S. Cl. ............................. 455/56.1; 455/8; 455/9; 455/33.1; 455/67.1; 379/59; 395/600; 364/268.2
[58] Field of Search ............................ 455/53.1, 33.1, 455/67.1, 56.1, 8, 9; 379/59; 364/268.2, 944.1; 395/600, 575

[56] References Cited

U.S. PATENT DOCUMENTS

| | | |
|---|---|---|
| 5,136,707 | 8/1992 | Block et al. . |
| 5,274,802 | 12/1993 | Altine .................................. 455/33.1 |

FOREIGN PATENT DOCUMENTS

| | | | |
|---|---|---|---|
| 9325051 | 12/1993 | WIPO | ................................. 455/33.1 |
| 9404006 | 2/1994 | WIPO | ................................. 455/33.1 |

OTHER PUBLICATIONS

Recommendation GSM 03.07—Version 3.2.1, "Restoration Procedures", pp. 8–9 (Feb. 1992).
Recommendation GSM 09.02—Version 3.8.0, "Mobile Application Part Specification DCS", ETSI, Section 5.8.4 "Procedures for Restoration of HLR", p. 275.

*Primary Examiner*—Andrew Faile
*Assistant Examiner*—Doris To
*Attorney, Agent, or Firm*—Burns, Doane, Swecker & Mathis, L.L.P.

[57] ABSTRACT

A method for restoring a home location register after a HLR crash in a mobile telephone system uses a previously saved backup copy. This copy is loaded into the home location register in the HLR unit. Thereafter, the records in the home location register that are no longer valid after loading the backup copy are updated.

5 Claims, 5 Drawing Sheets

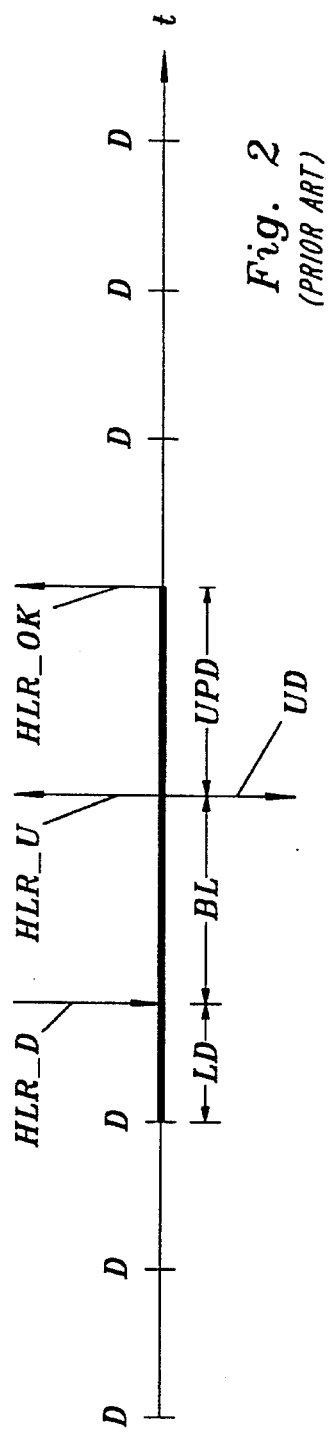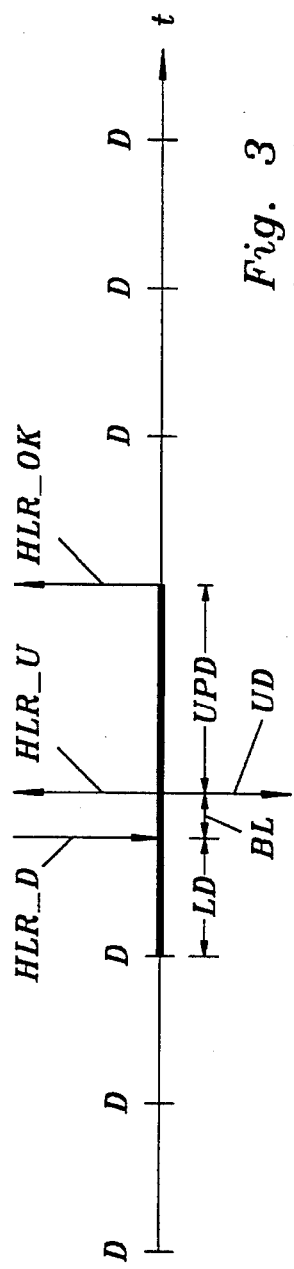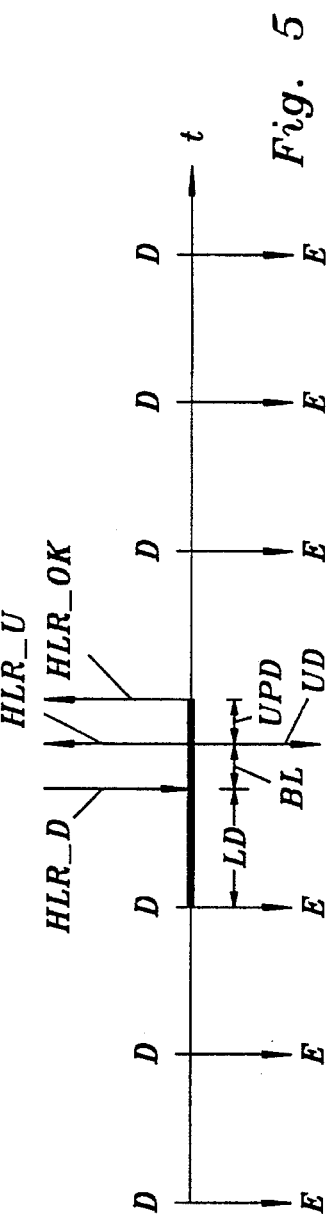

RESTORATION OF A HOME LOCATION REGISTER IN A MOBILE TELEPHONE SYSTEM

This application is a continuation of application Ser. No. 08/219,883, filed Mar. 30, 1995 now abandoned.

TECHNICAL FIELD

The present invention relates to a method for restoring a home location register in a so called HLR unit in a mobile telephone system after the information in the HLR unit has been lost after a HLR crash.

PRIOR ART

A HLR unit (HLR=Home Location Register) serves mobile services switching centers in a mobile telephone system. The HLR unit contains information on all the mobile telephone subscribers that belong to the geographical area that is covered by the mobile services switching centers connected to the HLR unit. This information is stored in a home location register. This data base contains a record for each connected subscriber in the mentioned geographic region. Each such record contains different types of information regarding the subscriber, for instance debit information, available services, etc. This information is called the categories of the subscriber. Furthermore, each record contains information regarding which mobile services switching center the subscriber currently is associated with, that is the "visited exchange" of the subscriber. The latter position information is required to redirect incoming calls to the subscriber to the mobile services switching center in the coverage area of which the subscriber currently is located.

In order to prevent a knock out of the entire mobile telephone system in the event of a HLR crash, a backup copy of the home location register is saved at regular intervals, for instance once every 24 hours. The purpose of this is to enable a restoration of the home location register in the event of a HLR crash when the HLR unit is restarted. This works well as regards the category information of the subscribers, since this information seldom changes, but the position information is not reliable, since the subscribers can have moved (roaming) since the last backup copy was made before the HLR crash. Thus, the "visited exchange" of the subscriber may have changed in the meantime. For this reason a so called position dump is made with shorter intervals, for instance every 15 minutes, so that the position information is updated more often on the backup unit. However, even this time period is too long, since many subscribers may have changed "visited exchange" during this period.

In previously known mobile telephone systems this problem is solved by letting the HLR unit send a message in connection with restart indicating unreliable position data to all mobile services switching centers connected thereto. These centers may then for instance erase stored category and position information for visiting subscribers from this HLR unit. This results in that all active visiting subscribers from this HLR unit are forced to send a position update message to the mobile services switching center and further to the HLR unit within the next (periodic) registration interval (typically 20 minutes) after restart of the HLR unit. This enables the HLR unit to update the positions of all the subscribers, so that incoming calls can be correctly redirected. Furthermore the mobile services switching centers regain their category information, so that they can establish new outgoing calls.

However, this method has several disadvantages.

More than half of the available traffic capacity has to be reserved for handling the extra load that arises when all the subscribers update their positions, which significantly reduces the capacity of the HLR unit.

The extra load induced in the HLR unit at restart only depends on the number of currently active subscribers and the length of the periodic registration interval. These parameters cannot be controlled in an efficient way.

The restoration time is too long and hard to control since other factors are influenced. A change (reduction) of the length of the periodic registration interval will for instance reduce the traffic handling capacity in the mobile services switching centers.

SUMMARY OF THE INVENTION

Thus, there is a need for a method for restoration of a HLR in which the time for restoring the HLR can be made as short as possible and in which the traffic capacity of the HLR is utilized in a more optimized way. An object of the present invention is to provide such a method.

The features of the invention are described in the attached claims.

The present invention is based on the insight that only the records in the HLR that are no longer valid after loading the backup copy have to be updated.

SHORT DESCRIPTION OF THE DRAWINGS

The invention, further objects and advantages obtained by the invention are best understood by reference to the following specification and the attached drawings, in which:

FIG. 1 diagrammatically shows the structure of a mobile telephone system;

FIG. 2 shows a time diagram of the events occurring in connection with a HLR crash handled in accordance with the prior art;

FIG. 3 shows a time diagram of the events occurring in connection with a HLR crash handled in accordance with the prior art;

Figure 4:
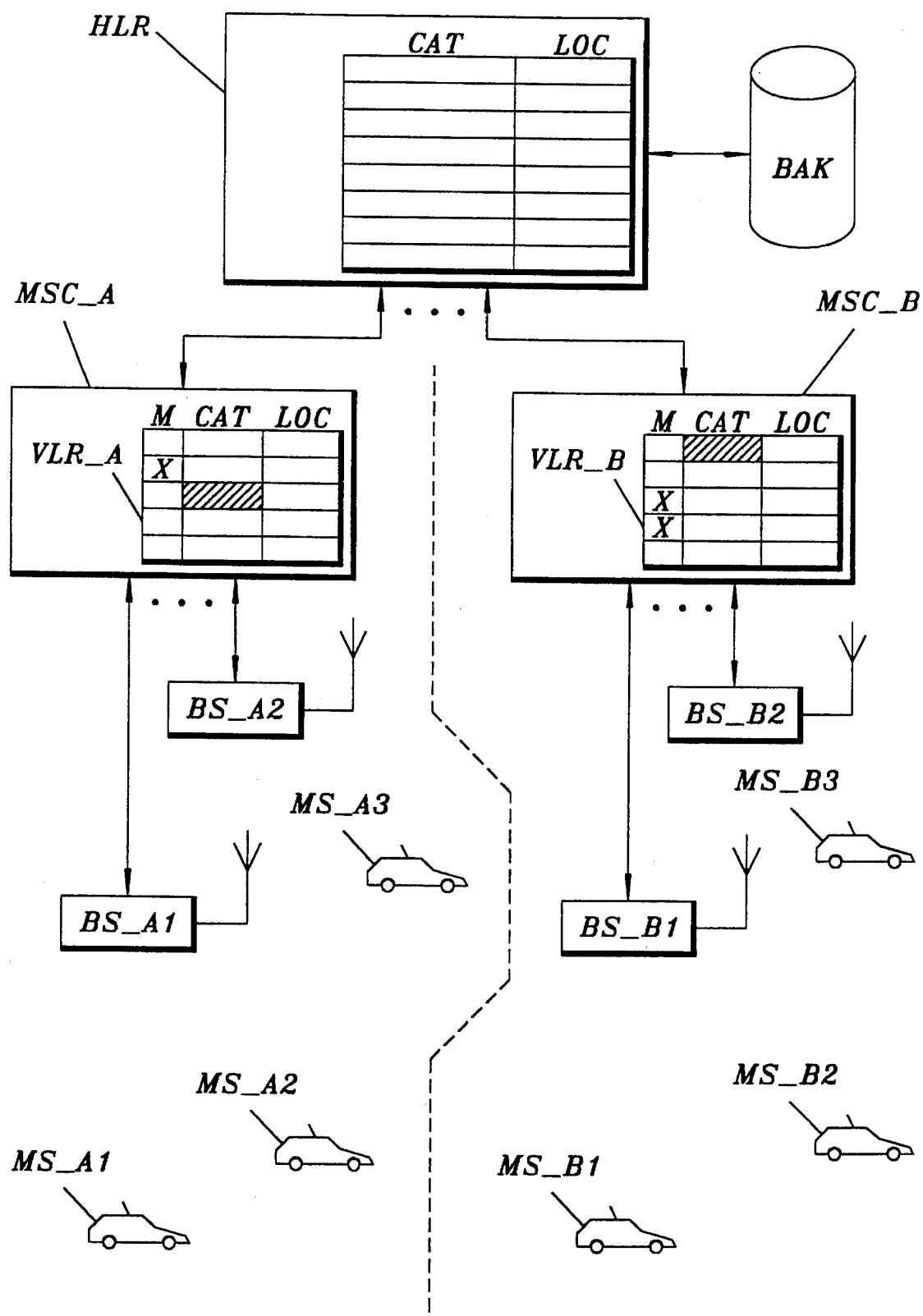
Figure 6:
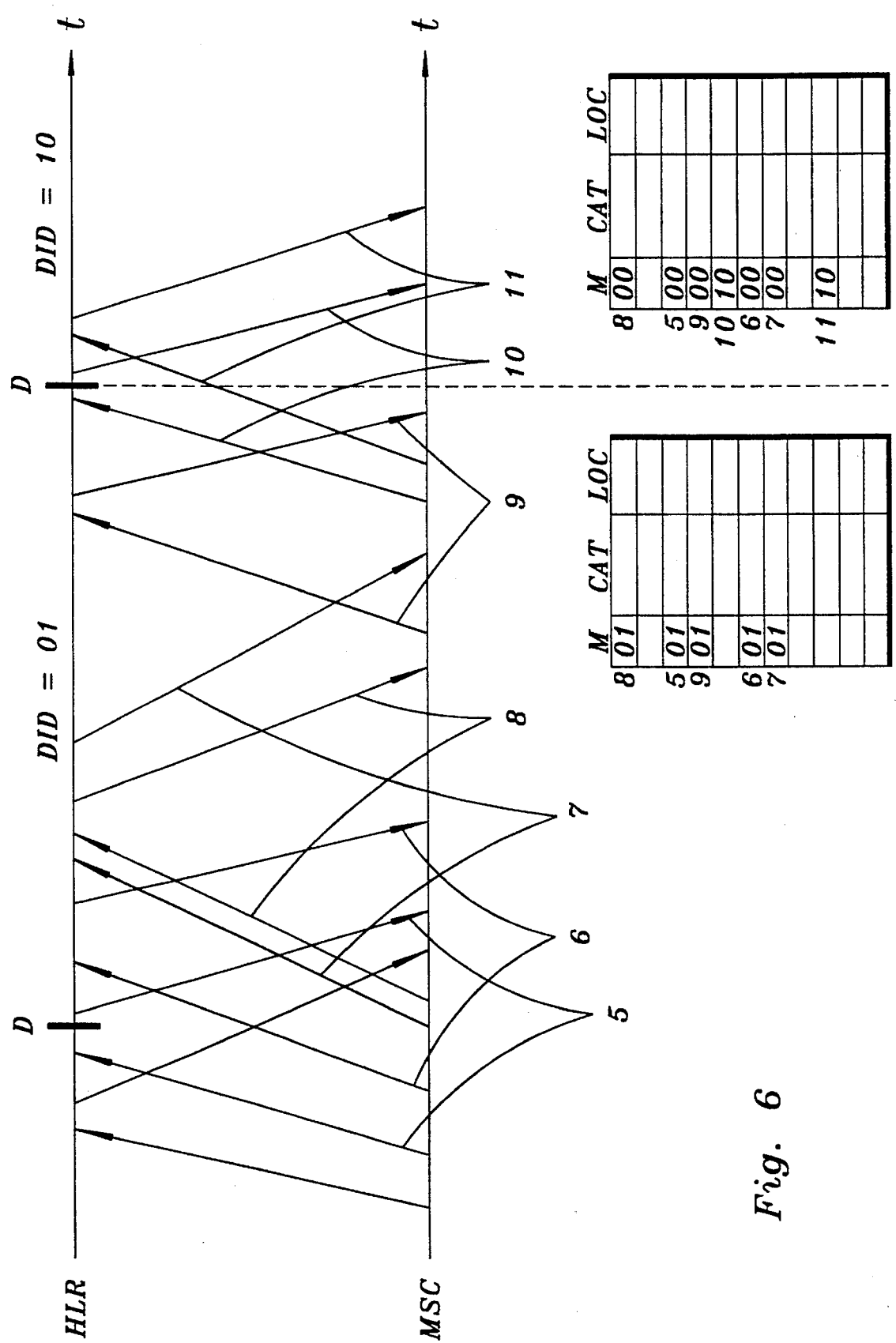
Figure 7:
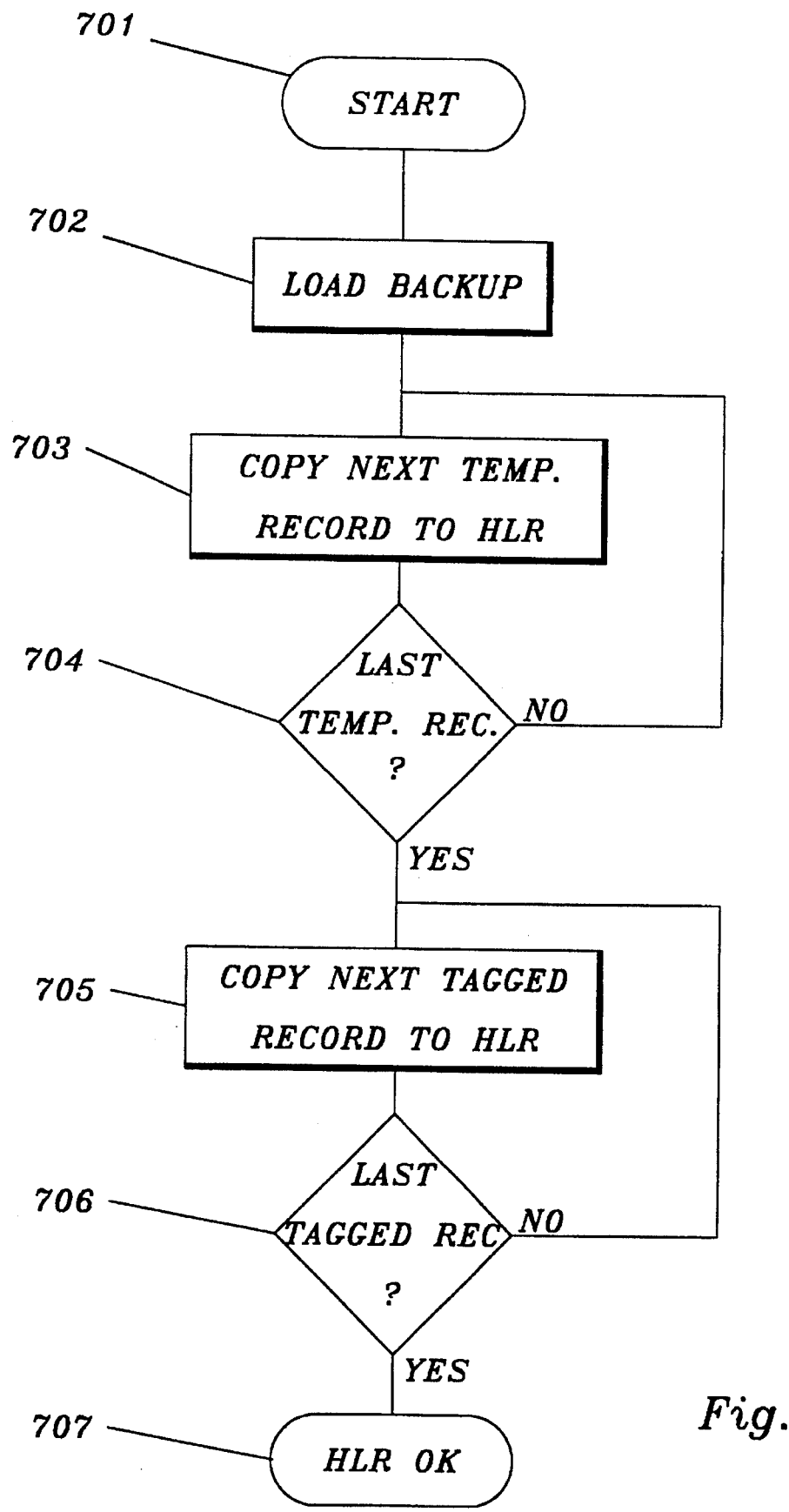

FIG. 4 diagrammatically shows the structure of a mobile telephone system operating in accordance with the present invention;

FIG. 5 shows a time diagram of the events occurring in connection with a HLR crash handled in accordance with the method of the present invention;

FIG. 6 shows a more detailed time diagram of the events occurring in a preferred embodiment of the method for tagging records in visiting location registers; and FIG. 7 shows a flow chart of the method in accordance with the present invention.

PREFERRED EMBODIMENTS

The same reference designations for corresponding elements are used throughout the drawings.

Figure 1:
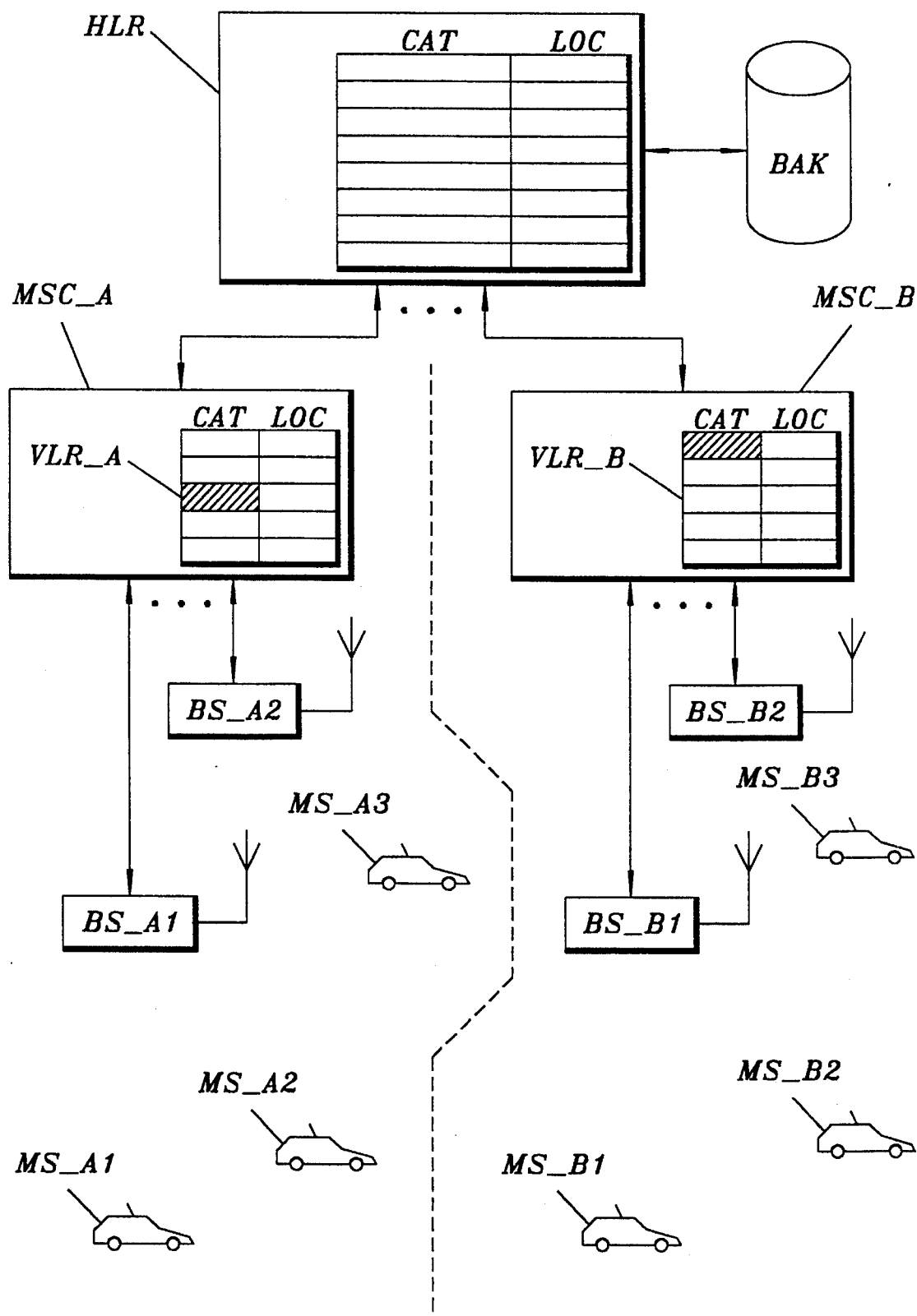

FIG. 1 diagrammatically shows the structure of a mobile telephone system. A HLR unit is connected to a number of mobile services switching centers MSC_A, . . . , MSC_B. These centers serve a number of base stations BS_A1, . . . , BS_A2 and BS_B1, . . . , BS_B2, respectively. The mobile services switching centers with their base stations serve respective geographic coverage areas. In the figure mobile services switching center MSC_A serves the geographic coverage area to the left of the dashed line in the middle of the figure, and mobile services switching center MSC_B serves the geographic coverage area to the right of this dashed line. The base stations connected to mobile services switching center MSC_A communicate with a number of mobile stations MS_A1, . . . , MS_A3. In the same way base stations connected to mobile services switching center MS_B communicate with mobile stations MS_B1, . . . , MS_B3.

The HLR unit contains a home location register, in which category information CAT and position information LOC for all active mobile stations in the coverage areas of the mobile telephone services switching centers connected to the HLR unit is stored. Furthermore, the HLR unit is connected to a backup unit BAK, in which a backup copy of the home location register is stored. The backup unit can for instance comprise a band station, a hard disk or BAM. At regular intervals, for instance once every 24 hours, a complete backup copy of the entire home location register is stored on this backup unit BAK. At significantly shorter intervals, for instance every 15 minutes, a so called position dump of position data is made on the backup unit. This makes it possible for the backup copy to maintain current position information for the mobile stations, that is information on which mobile services switching center they currently are associated with. The reason for this division is that the category information seldom changes, while the position information often changes.

When a mobile station leaves the coverage area of a visited exchange and enters the coverage area of another visited exchange, this category information is copied from the HLR unit to a visitor location register (VLR_A and VLR_B, respectively, in FIG. 1). This makes it possible to retrieve the category of the mobile station from the visitor location register in the new mobile services switching center for establishing an outgoing call. Since the position information of the HLR unit is also updated during the transfer between the coverage areas (roaming) the mobile station can also be reached by incoming calls.

In connection with a HLR crash the information in the HLR unit is destroyed. Therefore this information must be recreated in connection with restoration of the HLR unit. The previously known method for restoring the HLR unit will now be described with reference to FIG. 2.

FIG. 2 shows a time diagram of the events occurring in connection with HLR crash handled in accordance with the prior art. Before the crash the backup unit is updated at regular intervals at points D in time. At point HLR_D in time the HLR crash itself occurs. When the problem has been fixed the backup copy may be loaded from backup unit BAK. When this is done the HLR unit may be restarted at point HLR_U.

However, at point HLR_U when the backup copy has been loaded into the HLR unit, this backup copy is no longer consistent, that is it is no longer completely updated.

Firstly, a number of mobile stations have changed mobile services switching center (roaming) during the time interval LD between the latest position dump and the HLR crash. These mobile stations are registered in visitor location register VLR_A, VLR_B, and the change has also been registered in the HLR unit, but the information has been lost in the crash, since no dump of this information was performed before the crash.

Secondly, a number of mobile stations have changed mobile services switching center during the crash itself, that is during the time period BL. For these mobile stations no category information is available, since no such information can be copied from the crashed HLR unit to the visitor location register of the new mobile services switching center. For these mobile stations so called temporary records are established in the respective visitor location register during the crash period BL.

In order to restore a consistent home location register in the HLR unit a position update message is therefore transmitted from the HLR unit to all of the connected mobile services switching centers. This erases the category information in the visitor location registers in MSC_A, MSC_B. This in turn results in forcing the mobile stations to update their position within the next registration interval, typically approximately 20 minutes. This instruction is sent from the HLR unit at point HLR_U in time and has in FIG. 2 been marked by the arrow UD. This updating is then performed during time period UPD, so that the HLR unit has a consistent home location register at point HLR_OK. Thereafter the operation of the HLR unit may continue as usual with periodic position dumps at points D in time.

If it is assumed that the problem has been fixed directly after the crash, so that the entire interval BL comprises transmission of data from backup unit BAK to the HLR unit, it is appreciated that a reduction of the interval BL would result in a reduction of the total time between the HLR crash at point HLR_D and point HLR_OK at which the HLR unit has been completely restored. Such a reduction can be obtained for instance by letting the backup unit BAK comprise RAM.

FIG. 3 shows the previously known method in the case where time period BL has been reduced, for instance by letting backup unit BAK comprise RAM. However, from FIG. 3 it is apparent that the time UPD for updating the positions of the mobile stations is not influenced at all by this reduction of time period BL. Time period UPD depends only on the registration interval, which in a typical case is of the order of 20 minutes.

FIG. 4 diagrammatically shows the structure of a mobile telephone system that operates in accordance with the present invention. The mobile system in accordance with FIG. 4 comprises the same units as the mobile system in accordance with FIG. 1. However, the visitor location registers VLR_A, VLR_B in mobile services switching centers MSC_A, MSC_B have been provided with a tag field M for each record. The operation of the mobile telephone system in accordance with FIG. 4 will now be described with reference to the time diagram in FIG. 5.

As in the method of FIGS. 2 and 3 a position dump to backup unit BAK is performed at points D. In the method of the present invention, however, signals E, which will be further described below with reference to FIG. 6, are also sent to the mobile services switching centers MSC_A, MSC_B, and these signals reset the tags in tag fields M. The tags that in FIG. 4 are designated by X arise each time a mobile station leaves a coverage area and enters a new coverage area with another mobile services switching center. When a new record is established in the visitor location register in the new mobile services switching center a tag is set in this field. This tag indicates that this update of the position of the mobile station has not yet been saved on the backup unit BAK. When this is done in the next dump interval the tag is cleared.

When the HLR unit crashes at point HLR_D the backup copy is loaded during period BL as in the previously known method. During update period UPD, however, no new registration of each active mobile station is performed as in the previously known method. Instead only the records in the home location register that are no longer valid after loading of the backup copy are updated. This makes it possible to significantly reduce also update time UPD, which will be further described in an example below.

The present invention is based on the insight that the vast majority of mobile stations have not changed their position data during the time period from the previous position dump up to a HLR crash. Therefore the data obtained from the backup copy are valid for these stations. It is then unnecessary to let these stations reregister and thereby load the HLR unit unnecessarily. What has to be updated in the HLR unit are on the one hand the temporary records that have been created in the visitor location registers of the mobile services switching centers during the time period BL and on the other hand the records that have been created in the visitor location registers of the mobile services switching centers during the time period LD between the last position dump and the HLR crash. Both these types of records are easy to identify in the visitor location registers of the mobile services switching centers.

The first mentioned records lack category information, but can be used for updating position information in the HLR unit. The category information can thereafter be loaded from the HLR unit, which in turn has received this information from the backup copy.

The last mentioned records have been tagged in the tag field and contain both current category information and position information.

A comparison of performance for the old and the new method follows below.

It is assumed that the mobile telephone system has 400,000 connected subscribers in a HLR unit. The activity level is 50%, which gives 200,000 active subscribers spread out over six mobile services switching centers. The active subscribers are the ones that generate the load in the HLR unit. If the HLR unit were to be reloaded from for instance a hard disc, this would in a typical case take about 22 minutes for 400,000 subscribers plus a so called large restart of approximately 30 seconds. During this time period nearly half the number of active subscribers would have moved to other geographic coverage areas (roaming), which means that they can neither receive or initiate calls. The update period is approximately 15 minutes if the registration period is set to 20 minutes. In the worst case a subscriber cannot reach the system for nearly 40 minutes. The time period until the restoration is completed can actually be even longer, due to the fact that the subscribers are not evenly distributed over the system. Some mobile services switching centers are probably more loaded than others.

If the HLR unit has its backup unit in RAM instead, the reloading would take approximately 30 seconds plus approximately 30 seconds for a large restart. However, this does not influence the update period, which on the average is spread out over 15 minutes. Therefore, in the worst case a subscriber cannot reach the system during a time period of approximately 20 minutes. In the method of the present invention, however, the following situation occurs. If it is assumed that the HLR unit performs a position dump every 15 minutes to RAM, it is appreciated that the average time before a HLR crash is 7.5 minutes. On the average this gives 32,000 tagged new records in the visitor location registers of the mobile services switching centers in the system before the HLR unit crashes. The HLR unit will require approximately 34 seconds to reload the backup copy from the backup unit in RAM and 30 seconds, to perform the large restart. This implies that on the average 5,000 subscribers will remain in the backlog in the visitor location registers (created during time period BL). If the parameter that controls the update rate in the mobile services switching centers (REGLIMIT) is set equal to 70 signals per second and if it is assumed that all subscribers are evenly distributed over the mobile services switching centers, the information from the backlog and the new records may be transmitted to the HLR unit within approximately 90 seconds. Simultaneously the HLR unit would be able to handle traffic from over 200,000 active subscribers. The total restoration time is approximately 2.5 minutes and the handling capacity is utilized almost at a maximum.

If the position dump interval were to be reduced to a minute this would imply that on the average 2,000 new records would have been marked in the visitor location registers of the mobile services switching centers before the HLR unit crashes. With the same data for the remaining parameters the time for transmitting information from the backlog and from the new records would be approximately 15 seconds. The total restoration time would therefore be approximately 1.5 minutes.

The handling of the tag fields M will now be described more in detail with reference to FIG. 6.

The upward arrows in FIG. 6 show signals transmitted from a mobile services switching center MSC to a HLR unit. The downward arrows show signals from the HLR unit to the mobile services switching center MSC. The table to the left of the dashed line shows parts of the contents of the visitor location register of the mobile services switching center during a dump interval with the dump identification code DID=01. The table to the right of the dashed line shows the same data base during the dump interval with identification code DID=10.

When new records are created in the visitor location register when a new mobile station is to be serviced by the mobile services switching center a position update message is sent from the mobile services switching center to the HLR unit. This unit acknowledges receipt of this message by sending the dump interval identification code DID and the category information back to the mobile services switching center, which places this identification code in the tag field M.

During the dump interval with identification code DID=01 update messages are thus sent for records 7, 8 and 9. Since the acknowledgements have been transmitted within the dump interval identification code DID=01 these records will therefore contain a tag field M with value 01. The update messages for records 5 and 6 have been transmitted before the interval with identification code DID=01, but the acknowledgements have been transmitted during this interval, and for this reason these records will also receive the tag 01. These tags indicate that the HLR unit has received the information but not yet made any backup copy of this information. In connection with the transition from dump interval 01 to dump interval 10 the information is copied to the backup unit BAK, whereafter the tag fields for records 5–9 are cleared when the new dump interval identification code DID is received, since a backup copy of these records now exists in the event of a HLR crash.

The update messages of records 10 and 11 are transmitted at the end of interval 01, but the acknowledgements from the HLR unit are not transmitted until interval 10. These records will therefore receive the identification code 10 in tag field M. At the next dump these tag fields will also be cleared.

Of the newly created records in a visitor location register only the records with a tag field different from zero have to be updated in the event of an HLR crash. The remaining records already exist in the backup copy.

An alternative embodiment comprises updating the dump interval identification code modulo 96 (96=4×24, that is a position dump every 15 minutes for 24 hours). The tag fields will then be cleared only once every 24 hours, preferably at low traffic during night time. In this case the mobile services switching center transmits only the records that have the latest received dump interval identification code when a message relating to unreliable position data is received from the HLR unit after a HLR crash.

FIG. 7 shows a flow chart of the method in accordance with the present invention. In the event of a HLR crash the updating of the home location register is started in step 701. In step 702 the backup copy from backup unit BAK is loaded. In steps 703, 704 the home location is updated by transmitting temporary records from the visitor location registers of the mobile services switching centers to the HLR unit. At the same time category information is sent to the respective mobile services switching centers, so that the mobile telephones once again may obtain their category information. When the temporary records have been handled the tagged records in the visitor location registers are handled in steps 705, 706. When all these records have been handled the data base in the HLR unit is once again consistent in step 707.

A person skilled in the art appreciates that different changes and modifications of the invention are possible within the scope of the invention, which is defined by the attached patent claims.

We claim:

1. A method for restoring a home location register after a crash in a home location register unit of a mobile telephone system, said method comprising:

loading said home location register with a previously saved backup copy; and updating records in said home location register with information from visitor location registers of mobile services switching centers connected to said unit, said information being obtained from
  (i) records in said visitor location registers that have been tagged as changed since said backup copy was saved, and
  (ii) records in said visitor location registers that have been tagged as newly created since said backup copy was saved, thereby minimizing the update time of said home location register by reducing the number of records in said home location register that have to be updated to records that are no longer valid after loading of said backup copy.

2. The method of claim 1, wherein said newly created records are temporary records created after said crash and category information is lacking.

3. The method of claim 2, wherein said tagged records have been created after said backup copy has been saved but before the crash in the home location register unit, so that information from these records is used to update said home location register.

4. The method of claim 1, wherein said tagged records have been created after said backup copy has been saved but before the crash in the home location register unit, so that information from these records is used to update said home location register.

5. The method of claim 4, further comprising tagging said tagged records with an identification code for the latest backup copy before the crash in the home location register unit.

* * * * *